United States Patent [19]

Block

[11] Patent Number: 4,584,108

[45] Date of Patent: Apr. 22, 1986

[54] DISPERSIBLE ALPHA ALUMINA MONOHYDRATE HAVING INCREASED VISCOSIFYING PROPERTIES

[75] Inventor: Jacob Block, Rockville, Md.

[73] Assignee: W. R. Grace & Co., New York, N.Y.

[21] Appl. No.: 563,776

[22] Filed: Dec. 21, 1983

[51] Int. Cl.$^4$ .......................... C09K 7/04; C01F 7/02
[52] U.S. Cl. ............................ 252/8.5 B; 252/8.5 A; 252/315.7; 423/625; 423/626; 423/629
[58] Field of Search ............. 252/8.5 A, 8.5 B, 315.7; 423/625, 626, 629

[56] References Cited

U.S. PATENT DOCUMENTS

| | | | |
|---|---|---|---|
| 3,268,295 | 8/1966 | Armbrust et al. | 23/141 |
| 3,630,670 | 12/1971 | Bell et al. | 23/143 |
| 3,739,062 | 6/1973 | Barsotti | 423/625 |
| 3,919,403 | 11/1975 | Pullen et al. | 423/628 |
| 4,240,915 | 12/1980 | Block | 252/8.5 |
| 4,313,923 | 2/1982 | Block et al. | 423/628 |
| 4,399,119 | 8/1983 | Takumi et al. | 423/626 |
| 4,431,550 | 2/1984 | Block | 252/8.5 A |
| 4,447,341 | 5/1984 | Block | 252/8.5 A |
| 4,492,682 | 1/1985 | Trebillon | 423/626 |

FOREIGN PATENT DOCUMENTS

| | | |
|---|---|---|
| 1246697 | 8/1967 | Fed. Rep. of Germany . |
| 2123804 | 2/1984 | United Kingdom . |

*Primary Examiner*—Prince E. Willis
*Attorney, Agent, or Firm*—Edward J. Cabic

[57] ABSTRACT

An alpha alumina monohydrate, AlO(OH), gel is produced which is capable of readily dispersing in aqueous solutions to yield a shear-rate thinning mixture. The alpha alumina monohydrate is made by reacting an acid reactant and a base reactant, wherein at least one contains aluminum, in an aqueous medium in proportions to yield a mixture having a pH of from about 7.5 to 10. The gel is treated to remove much of the by-product salts. One preferred method involves filtering the reaction product to remove the by-product salts and then further washing the filter cake with water. Upon dispersing the filter cake in water it yields a shear-rate thinning liquid having increased viscosifying power per unit weight of the AlO(OH) and this is measured as a higher K value in the rheological power model.

18 Claims, No Drawings

DISPERSIBLE ALPHA ALUMINA MONOHYDRATE HAVING INCREASED VISCOSIFYING PROPERTIES

BACKGROUND OF THE INVENTION

1. Field of the Invention

This invention relates to an improved process to make an alpha alumina monohydrate powder which is useful as a shear-rate thinning viscosifier in drilling fluids.

2. Description of the Previously Published Art

U.S. Pat. No. 4,240,915 to Block describes water-based, clay-free drilling fluids for use in drilling bore holes into subterranean formations which contain water, a water-loss inhibitor, a weighting agent and aluminum hydroxide as a viscosifying agent. The aluminum hydroxide viscosifying agent is prepared in an aqueous medium by contacting and mixing under a high degree of agitation an acid reactant and a base reactant wherein at least one of the acid or base reactants contains aluminum. The acidic reactant can be either an inorganic acid or a salt of a strong acid and a weak base. These aqueous compositions contain a significant amount of water and are expensive to transport.

To reduce the water weight, attempts have been made to dry the aluminum hydroxide. However, when it is dried, the aluminum hydroxide powder does not readily disperse back into water to yield the original shear-rate thinning material. Thus this dried form would not be suitable for its intended use at a well site where it should be able to disperse in water to form a shear-rate thinning drilling fluid.

U.S. Pat. No. 4,244,835 to Block describes one way to solve this problem of redispersing the dried aluminum hydroxide powder in water. There it was necessary to add a base such as a water soluble alkali metal hydroxide, carbonate or oxide to the mixture and it was further necessary to employ high shear mixing. This technique, however, not only requires the presence of additional chemicals which increase the cost of the drilling fluid but it also requires high shear mixing. In addition the handling of the caustic is hazardous and it may result in the pH of the reaction mixture being too high which would then require readjusting with an acidic material.

In U.S. patent application Ser. No. 391,112 filed June 23, 1982 and now abandoned to Block a relatively dry solid AlO(OH) is formed by heat aging the reactants at a temperature of from about 60° C. to 100° C. for a period of from about 2 to 7 hours. There the heat aging is shown to be critical since AlO(OH) produced without the heat aging and dried to an AlO(OH) content of at least 35% by weight could not be redispersed in water. The filter cake was washed to remove by-product salts, but no special significance was attributed to the washing step.

3. Objects of the Invention

It is an object of this invention to produce an alpha alumina monohydrate gel which can be dispersed in water to yield a highly shear-rate thinning fluid with an n value in the power law model (to be discussed below) of less than 0.3 and with an increased K value without the aid of large quantities of acids, bases, excessive high shear mixing or heat aging.

It is a further object of this invention to form a shear-rate thinning alpha alumina monohydrate in an aqueous system by reacting under a high degree of agitation an acid reactant and a base reactant wherein at least one of the acid or base reactants contains aluminum and to then utilize a salt removal treatment to produce an alpha alumina monohydrate form of aluminum hydroxide which can be dispersed in water to form a shear-rate thinning material without the need for any large quantities of auxiliary dispersing agents, any expensive high shear mixing equipment, or time consuming thermal aging.

It is a further object of this invention to produce an aluminum hydroxide viscosifying material which can be dried and then dispersed to yield a shear-rate thinning viscosifier with a higher K value per gram of AlO(OH) than previously obtained.

These and further objects will become apparent as the description of the invention proceeds.

SUMMARY OF THE INVENTION

A salt removal treatment of an AlO(OH) gel produces a form of alpha alumina monohydrate which can be readily dispersed in water to yield a shear-rate thinning material with a high K value. For AlO(OH) dispersed in water, the higher the K value per unit weight of AlO(OH) (in the rheological power model) the more viscous is the dispersion. Thus, to obtain a drilling fluid with a given viscosity, one can use less of the present AlO(OH) which exhibits a higher K. The form of alpha alumina monohydrate described herein is also known as pseudoboehmite. The terms alpha alumina monohydrate, aluminum hydroxide, AlO(OH) and pseudoboehmite as used herein are synonymous. It is understood, however, that an unknown amount of water is associated with the product. However, when weight percents are expressed they are in terms of AlO(OH) excluding the water.

The shear-rate thinning gel is first prepared in the preferred form by mixing sodium aluminate and aluminum chloride either as solutions or as solids which are added to water and combined together with high-speed mixing. The proportions are chosen so as to yield a product having a pH between about 7.5 and about 10.0 and an AlO(OH) concentration which is preferably less by about 5% by weight. Higher concentrations cause the reaction mixture to become too viscous and therefore difficult to handle and produces a poor product. After the reaction product is obtained, heating of the reaction product is avoided to prevent the crystallization of the AlO(OH). By maintaining ambient conditions during the production of the reaction product crystallization of the AlO(OH) is minimized. Then, according to the present invention, the reaction product is treated to remove much of the by-product salt. One preferred method is to filter the reaction product so as to remove much of the salt dissolved in the aqueous phase. The filter cake obtained is further washed with water to remove additional quantities of salt which have adhered to the AlO(OH) solid phase. The wet filter cake can be redispersed in water and transported as an aqueous mixture. Alternatively, the filter cake can be dried to reduce the water content so the product has an AlO(OH) content of from about 20 to about 25% by weight.

Any amount of by-product salt reduction is beneficial. As shown in the examples, when the AlO(OH) is made in one embodiment without any salt removal, the consistency index, K, has a value of 6.2 lb-sec/100 ft$^2$. When the salt was removed by filtration, the value of K increased to 9.6 lb-sec/100 ft$^2$. Upon further treatment by washing the filter cake, the value of K was increased up to 29 lb-sec/100 ft$^2$.

DESCRIPTION OF THE PREFERRED EMBODIMENTS

Various methods are well known to form the desired AlO(OH) viscosifying agent. See, for example, U.S. Pat. Nos. 4,240,915; 4,244,835; and U.S. patent application Ser. No. 391,112 filed June 23, 1982 and U.S. patent application Ser. No. 370,979 filed Apr. 22, 1982 now U.S. Pat. No. 4,431,550. Due to the amphoteric nature of aluminum, the alpha alumina monohydrate can be formed by contacting an aqueous solution or suspension of an acidic or basic aluminum containing precursor material with a neutralizing agent. The order of addition is not important; the reactants can be added in any order or simultaneously.

The basic precursor material can be an alkali metal aluminate which is contacted with a sufficient amount of an acidic agent such as inorganic mineral acid, as for example sulfuric, hydrochloric, nitric and the like, and preferably hydrochloric, or a salt of a strong acid and a weak base to cause the pH of the solution to be reduced to within the ranges described further and to thereby convert the aluminate to the desired alpha alumina monohydrate agent used. The acid can be used in slight excess and then back titrated with a base to the desired pH to assure conversion of the precursor to the hydroxide. The aluminate precursor can be any commercially available alkali metal aluminate or the aluminate can be obtained by conventional techniques such as by the action of a base on aluminum or aluminum oxide. The aluminate normally will have an alkali metal oxide to aluminum oxide mole ratio of from about 1:1 to 2:1.

Suitable acidic precursor materials for forming the alpha alumina monohydrate agent are water-soluble, acidic aluminum salts such as aluminum halides, preferably aluminum chloride, as well as aluminum sulfate, aluminum nitrate and the like. Aqueous solutions of these precursor materials can be contacted with a sufficient amount of water-soluble base, such as an alkali metal hydroxide as, for example, sodium hydroxide, potassium hydroxide and the like or ammonium hydroxide to cause the resultant aqueous system to have a pH within the range described below and to thereby form the desired aluminum hydroxide agent. The base should be used in an amount such that the final pH is between about 7.5 to 10.

The desired alpha alumina monohydrate can also be formed from an acidic aluminum precursor material such as a water-soluble acidic aluminum salt as described above with a basic aluminate as described above by contacting the precursory materials in an aqueous system in suitable ratios to cause the resultant system to have a pH within the range described below.

The aluminum hydroxide agents should be formed in an aqueous system which has a pH above about 7.5 to about 10 and preferably a pH of from about 8 to about 9.5. The drilling fluids formed with such aqueous systems having a pH within the range of about 8 to about 10.3 and preferably between about 9 to 10 exhibit the desired properties of viscosity and non-Newtonian pseudoplasticity.

The alpha alumina monohydrate agent is preferably formed in an aqueous system. The acidic or basic precursor material can be present in concentrations of from about 1 to 50 percent by weight based on the water present. The concentration can vary outside of this range, but should not be such as to inhibit the thorough mixing, preferably under high speed agitation, of the reactants during the formation of alpha alumina monohydrate viscosifying agent.

After the reaction product is obtained, various types of treatments can be used to reduce the amount of by-product salts. One of the preferred techniques is to place the reaction product on a belt filtering and dewatering device. As the belt moves from the loading zone, the water drains through the belt to leave a filter cake. This filter cake on the belt can be sprayed with water to additionally wash off any remaining salts. Other salt removing techniques include dialysis, ultra filtration, ion exchange and reverse osmosis.

The above-described salt reduced alpha alumina monohydrate is capable of yielding a clay-free, (the term "clay-free" when used herein refers to the absence of drilling fluid viscosifying clays as an essential agent of the fluid and not to other materials entrained therein) water-based drilling fluid (the term "fluid" or "system" when used herein refers to water containing the salt-reduced alpha alumina monohydrate of the subject invention in solution, suspension or dispersion) which has superior rheological properties of viscosity and non-Newtonian, pseudoplasticity. The viscosity of the resultant water-based drilling fluid varies inversely with respect to the shear-rate exerted on the fluid. The relationship of the shear stress with respect to shear-rate can be defined by the rheological power law model relationship of $\tau = K(\delta)^n$, in which $\tau$ represents the shear stress exerted on the aqueous system of the drilling fluid in units such as pounds per 100 ft$^2$ or dynes/cm$^2$; $\delta$ is the shear-rate in units of reciprocal time such as sec$^{-1}$; K is a consistency index which is a constant having the value of the shear stress of the particular system at a shear-rate of 1 sec$^{-1}$. K is directly related to the viscosity at 1 sec$^{-1}$, the higher the K the higher the viscosity at 1 sec$^{-1}$. The term n is a numerical value greater than zero. If n=1, the system is Newtonian, if n is less than 1 the system is shear rate thinning. The lower the n value the more shear rate thinning the system.

Water-based drilling fluids containing the presently described salt reduced alpha alumina monohydrate viscosifying agent exhibit shear stress ($\tau$) properties at varying shear-rates ($\delta$) in the range of from about 10 to 400 sec$^{-1}$, that is, in the range normally encountered in the annular region of the bore hole, such that n of the power law relationship has a value of less than about 0.3. Such systems, therefore, exhibit non-Newtonian, pseudoplastic properties to an exceptionally high and desirable degree.

When plotting log shear stress on the ordinate versus log shear-rate on the abscissa of a graph, the slopes and intercepts provide useful information. At low shear-rates, such as from about 10 to about 400 sec$^{-1}$, as are encountered in the annular region of the bore hole, the shear stress should increase at a low rate with respect to the shear-rate exerted on the material which is observed as a low slope (or n value according to the power law relationship) of the curve. The lower the slope of n value within this region the more desirable the fluid. In certain instances the slope may continuously or segmentally change, but it should retain an n value of about 0.3 or less. At high shear-rates, such as above 50,000 sec$^{-1}$ as are found in the region of a drill bit in a drilling operation, the fluid should have a low viscosity, that is, approach the viscosity of water since this permits high drilling rates. At such viscosities the fluid approaches a Newtonian liquid and there is an increased slope of the curve with n having a value approaching or equal to unity. The value for K in the power law relationship is the shear stress value determined or extrapolated for a shear-rate of 1 sec$^{-1}$ and is equivalent to the viscosity of the aqueous system at 1 sec$^{-1}$. Therefore, the higher the K value, the higher the viscosity at 1 sec$^{-1}$.

When the viscosifier provides a higher viscosity to a drilling fluid per unit weight of material added as measured by the higher K value, then this permits the oil field operator to use less of the viscosifier to achieve the desired viscosity level for the drilling fluid. Thus, the advantage of the present reduced-salt AlO(OH) viscosifier material with its high K value is that less of the material can be used to make the drilling fluid.

The salt-reduced AlO(OH) when in a drilling fluid exhibits non-Newtonian, pseudoplastic properties under varying low shear-rates of from about 10 to 400 sec$^{-1}$ and greater, such as are encountered in the annular region between the drill stem and the the bore hole wall. The drilling fluid aids in increasing the drilling efficiency which is the rate of drilling of the bore hole. Drilling fluids having concentrations of from about 0.5 to about 5 percent, and preferably 1 to 3 percent, active solids (as alpha alumina monohydrate) yield fluid systems which have the desired properties.

The drilling fluid composition can contain other conventional drilling fluid additives such as water loss inhibitors as, for example, polyanionic cellulose and the like or cross-linked polyvinyl alcohol as described in U.S. Pat. No. 4,349,443 and in Reissue application Ser. No. 446,217 filed Dec. 2, 1982, now U.S. Pat. No. Re. 31748, the disclosures of which are incorporated herein by reference. The drilling fluid composition can also contain weighting agents as, for example, crushed oyster shells, barite, and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The drilling fluids containing the salt-reduced AlO(OH) has several distinct advantages over fluids using conventional viscosifying agents, such as clays, Xanthan gums or synthetic organic polymers. The presently described drilling fluids have been found to be stable to various salts commonly found in drilling fluid compositions, while the commonly used clays, such as bentonite are normally sensitive to the presence of such salts and lose their ability to function properly in the fluids. Such clays should, therefore, not be used as a viscosifier component in these drilling fluids. Xanthan gums are also used as the viscosifying agents in drilling fluids, but have the disadvantage of being expensive and unstable at high temperature conditions. The presently described drilling fluids need not contain such heat sensitive viscosifier materials as xanthan gums and, therefore, can maintain their viscosity and pseudoplasticity after subjection to elevated temperatures as is normally encountered in bore holes. Synthetic organic polymers which are used as viscosifiers in drilling fluids are expensive and are only used under special application.

The present water-based, clay-free drilling fluids, having as their viscosifying agent the salt-reduced alpha alumina monohydrate agent described above and having a pH within the range of from at least about 8 to 10.3, have been found to be stable to temperature, the presence of calcium and sodium salts and to the presence of conventional drilling fluids, are substantially non-corrosive and non-destructive to metal equipment commonly used in drilling operations.

This material can be used with conventional bore hole drilling equipment in manners known to those skilled in the art to efficiently and effectively drill bore holes into subterranean formations. The pseudoplastic properties of the present drilling fluid permits effective removal of the cuttings from the area at and around the drill bit to permit more efficient drilling of the formation.

Having described the basic aspects of our invention, the following examples are given to illustrate specific embodiments thereof.

COMPARISON EXAMPLE 1

This example describes rheological properties of 3% AlO(OH) before by-product salts are removed.

A 3% AlO(OH) slurry was prepared by adding 178.5 g of a sodium aluminate solution (20% $Al_2O_3$, $Na_2O$ to $Al_2O_3$ mole ratio equals 1.5) to 1050 g of a 7.1% HCl solution. After mixing for 20 minutes, the product was allowed to age at ambient conditions for 20 hours. After re-shearing the rheological properties were determined using a Haake RV-3 rheometer. The n and K values (power law model) found were 0.33 and 6.2 lb-sec/100 ft$^2$ respectively. The chemical analysis of the slurry is shown in Table I.

TABLE I

| ANALYSIS OF SLURRY | | |
|---|---|---|
| $Al_2O_3$ (%) | Total Volatiles (%) | NaCl (%) |
| 2.9% | 92.7% | 4.4% |

EXAMPLE 1

This example shows that a higher K value (a more viscous slurry) can be obtained by removing some of the by-product salts.

An AlO(OH) slurry was prepared as described in Comparison Example 1. The slurry was filtered to remove some of the by-product salts. The analysis of the filter cake is shown in Table II.

TABLE II

| ANALYSIS OF FILTER CAKE | | |
|---|---|---|
| $Al_2O_3$ (%) | Total Volatiles (%) | NaCl (%) |
| 10.6% | 85.6% | 5.9% |

The cake was re-dispersed to 3% AlO(OH) and the rheological properties determined. The n and K values were 0.23 and 9.6 lb-sec/100 ft$^2$ respectively. The K value is significantly higher than the K value obtained in Comparison Example 1.

EXAMPLE 2

This example shows that the removal of additional by-product salt by washing the filter cake can further increase the K value.

The cake described in Example 1 was washed with water to remove additional excess salt. The analysis of the resultant washed cake is shown in Table III.

TABLE III

ANALYSIS OF WASHED FILTER CAKE

| $Al_2O_3$ (%) | Total Volatiles (%) | NaCl (%) |
|---|---|---|
| 12.0% | 86.6% | 1.5% |

The washed cake was re-dispersed to 3% AlO(OH) and the rheological properties determined. The n and K values were 0.18 and 29 lb-sec/100 ft$^2$ respectively. The K value is significantly higher than the K value obtained in Comparison Example 1 and Example 2.

It is understood that the foregoing detailed description is given merely by way of illustration and that many variations may be made therein without departing from the spirit of this invention.

What is claimed is:

1. In the method of making uncrystallized AlO(OH) gel for use in a drilling fluid by reacting an acid and a base, at least one of which contains an aluminum salt, to form a reaction product slurry comprising uncrystallized AlO(OH) and a by-product salt, the improvement comprising treating the reaction product to reduce the amount of by-product salt by filtering the reaction product slurry and water-washing the recovered filter cake so as to increase the viscosifying power of the AlO(OH) when dispersed in water as measured by a higher K in the power law model.

2. A process according to claim 1, wherein the washed filter cake is further dried to an AlO(OH) content of about 20 to about 25% by weight.

3. A process according to claim 1, wherein after the reaction product is formed it is maintained at ambient conditions prior to the salt-reducing treatment.

4. A process according to claim 1, wherein the AlO(OH) is formed in the reaction slurry in an amount less than about 5% by weight.

5. A process according to claim 1, wherein the acid reactant is hydrochloric acid and the base reactant is sodium aluminate.

6. A process according to claim 5, wherein the hydrochloric acid and sodium aluminate are added in proportions to yield a solution having a pH of from about 7.5 to about 10.

7. A process according to claim 1, wherein the acid reactant is hydrochloric acid and the base reactant is potassium aluminate.

8. A process according to claim 7, wherein the hydrochloric acid and potassium aluminate are added in proportions to yield a solution having a pH of from about 7.5 to about 10.

9. A process according to claim 1, wherein the acid reactant is aluminum halide, the base reactant is an alkali metal aluminate, and the alkali metal aluminate and the aluminum halide are added in proportions to yield a solution having a pH of from about 7.5 to about 10.

10. In the process of drilling a bore hole into a subterranean formation using conventional bore hole drilling equipment, the improvement comprising circulating in the bore hole while drilling a drilling fluid having as its viscosifying agent the AlO(OH) made by the process of claim 1.

11. A process according to claim 10, wherein the drilling fluid has as its viscosifying agent the AlO(OH) made by the process of claim 2.

12. A process according to claim 10, wherein the drilling fluid has as its viscosifying agent the AlO(OH) made by the process of claim 3.

13. A process according to claim 10, wherein the drilling fluid has as its viscosifying agent the AlO(OH) made by the process of claim 4.

14. A process according to claim 10, wherein the drilling fluid has as its viscosifing agent the AlO(OH) made by the process of claim 5.

15. A process according to claim 10, wherein the drilling fluid has as its viscosifying agent the AlO(OH) made by the process of claim 6.

16. A process according to claim 10, wherein the drilling fluid has as its viscosifying agent the AlO(OH) made by the process of claim 7.

17. A process according to claim 10, wherein the drilling fluid has as its vicosifying agent the AlO(OH) made by the process of claim 8.

18. A process according to claim 10, wherein the drilling fluid has as its viscosifying agent the AlO(OH) made the process of claim 9.

* * * * *